United States Patent [19]

Moe

[11] 3,972,817
[45] Aug. 3, 1976

[54] FILTER, ESPECIALLY FOR BACK WATER

[75] Inventor: Per Jacob Moe, Nesbru, Norway

[73] Assignee: Myrens Verksted A/S, Oslo, Norway

[22] Filed: June 9, 1975

[21] Appl. No.: 584,926

Related U.S. Application Data

[63] Continuation of Ser. No. 422,848, Dec. 7, 1973, abandoned.

[30] Foreign Application Priority Data

Dec. 8, 1972 Norway............................. 4549/72

[52] U.S. Cl............................ 210/325; 210/333 A; 210/391; 210/411
[51] Int. Cl.[2].................. B01D 33/00; B01D 35/16
[58] Field of Search ........... 210/325, 333, 391, 411, 210/370

[56] References Cited
UNITED STATES PATENTS

| | | | |
|---|---|---|---|
| 1,812,042 | 6/1931 | Genter................................ | 210/325 |
| 2,707,905 | 5/1955 | Mathewson...................... | 210/329 X |
| 2,960,232 | 11/1960 | Gillette........................... | 210/332 X |
| 3,176,846 | 4/1965 | Adams.............................. | 210/333 |

OTHER PUBLICATIONS
B357,566, Dec. 1967, Schmid, et al. 210/411 X.

*Primary Examiner*—Charles N. Hart
*Assistant Examiner*—Ferris H. Lander
*Attorney, Agent, or Firm*—Holman & Stern

[57] ABSTRACT

A filter comprising a vessel in the form of a closed drum which is rotatably mounted about a horizontal central axis, and a plurality of longitudinal, hollow, horizontal filter elements which are arranged in a ring. The filter elements extend between and are connected to the end walls of the drum for rotation about the central axis together with the drum. The peripheral surfaces of the filter elements constitute a filter surface which, upon rotation of the drum and the elements, will submerge into and emerge from the liquid to be filtered which is contained in the drum. At one end the filter elements extend through the end wall of the drum, and this end of the filter elements is open to permit unobstructed discharge of the filtrate. A blow tube with nozzle means is provided within each filter element, with the blow tube serving to remove solids deposited on the filter surface when the surface is above the liquid level in the vessel. Each filter element is rotatably mounted in the end walls of the drum, and means are provided for rotating the filter element about its longitudinal axis during the period in which the filter element is above the liquid level in the drum. A stationary through the upwardly facing opening of which lies above the liquid level, is positioned above the uppermost portion of the orbit of the filter elements for collecting and removing the solids detached from the filter surface.

8 Claims, 4 Drawing Figures

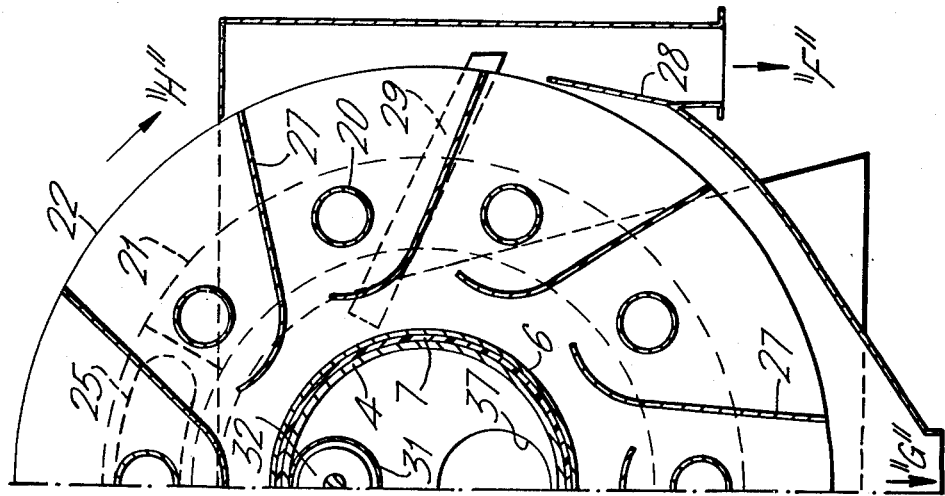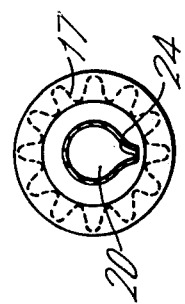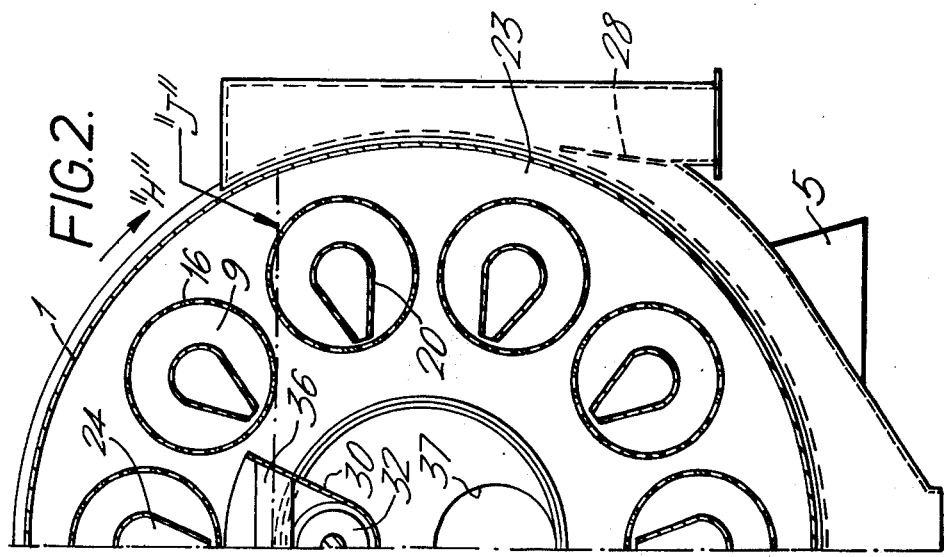

FILTER, ESPECIALLY FOR BACK WATER

This is a continuation of application Ser. No. 422,848, filed Dec. 7, 1973, now abandoned.

BACKGROUND OF THE INVENTION

The present invention relates to a filter, especially for separating fibers from back water in the wood pulp industry, comprising a filter surface which can be moved down into and up from the liquid to be filtered which is contained in a vessel, with said filter surface being constituted by the peripheral surface of a plurality of longitudinal, hollow, horizontal filter elements which are arranged in a ring, a reduced pressure being maintained on the side of the filter surface opposite the liquid compared with the static pressure of the liquid in the vessel, and means for removing the solids deposited on the filter surface when the surface is above the liquid in the vessel.

The filter is especially intended for the wood pulp industry, primarily for filtering of back water for recovering fibers and purifying the back water. However, it may also be used for thickening of pulp etc. Outside the wood pulp industry, the filter may be used e.g. as clean water filter and for recovery, purification and thickening of screenable suspensions in general.

PRIOR TECHNIQUES

DT-PS 657,163 discloses a filter device for a thick mass, wherein the filter surfaces are constituted by a plurality of longitudinal, hollow filter elements which rotate horizontally both about their own axes and about a common horizontal axis. According to this patent specification, each filter element in sequence is only partly submerged in the thick mass while at the same time rotating about its own axis to permit a filter cake to deposit on the filter surface by adhesion. When the deposited filter cake has a sufficient thickness, the individual filter elements are subjected to an underpressure in order to draw the filtrate through passages provided within the filter elements.

From DT-PS 612,706, there is known a filter device comprising a plurality of longitudinal, horizontal filter elements which are arranged in a ring, and which rotate about a common horizontal axis with an oscillating movement, said with filter elements being completely submerged in the content of an open vessel. However, as in the device according to DT-PS 657,163, the filtering depends upon the filter elements subjected to an underpressure during or immediately after the submerged phase of the filtering cycles. The filter cakes which have deposited on the filter elements, will, according to DT-PS 612,706, be removed by subjecting the filter elements to an over-pressure. However, this alone is not sufficient, and the cleaning of the filter elements must be completed by doctor means.

SUMMARY OF THE INVENTION

The object of the present invention is to arrive at a filter of the type referred to initially, in which the static pressure in the liquid to be filtered can be more effectively utilized, so that it is not necessary to equip the filter with complicated suction means to achieve a sufficiently effective filtration.

The filter of the invention is characterized in that the vessel takes the form of a closed drum which is rotatably mounted about a horizontal central axis, and that the filter elements extend between and are connected to the end walls of the drum for rotation about the central axis together with the drum, with said filter elements at one end extending through the end wall of the drum and being open at this end to permit unobstructed discharge of the filtrate.

Hence, a high average screening pressure differential and accordingly a better screening capacity are achieved.

In a preferred embodiment of the invention, a blow tube with nozzle means is provided within the filter element, with said blow tube serving to remove solids from the filter surface of a filter element when this element is above the liquid level in the drum.

A further feature of the filter according to the invention resides in the fact that the nozzle means are adapted to act on a limited portion of the circumference of the filter surface, that the filter element is rotatably mounted about its own longitudinal axis, and that there are provided drive means effective, when the filter element is above the liquid level of the drum, for rotating the filter element about its own longitudinal axis with such a speed that the nozzle means will act upon the total filter surface during the period in which the filter element is above the liquid level.

Because the filter according to the invention is assembled from several separate filter elements, these elements can easily be replaced in case of repair of the screen, and the capacity of the filter may be adjusted by covering the outlet opening of one or more of the filter elements. Alternatively, the filters may be delivered with a reduced number of filter elements, with the capacity being increased later by adding filter elements.

By shaping the filter elements to give them a star-shaped or wave-shaped cross-section, the filter surface may be doubled four times compared with a conventional circular cylindrical filter drum having a diameter equal to the circumscribed circle of the filter elements, and since the filter surface determines the capacity of the filter, the filter of the invention can thus be given a very large filtering capacity relative to its space requirements.

BRIEF DESCRIPTION OF THE SEVERAL VIEWS OF THE DRAWING

Further features and advantages of the invention will appear from the following description, reference being had to the accompanying drawing, which illustrates a filter for separating fibers from back water in the wood pulp industry.

FIG. 2 is a sectional view taken along the line B—B in FIG. 1.

FIG. 3 is a sectional view taken along the line A—A in FIG. 1.

FIG. 4 is a cross-section through an alternative embodiment of a filter element.

DESCRIPTION OF THE PREFERRED EMBODIMENTS

Figure 1:
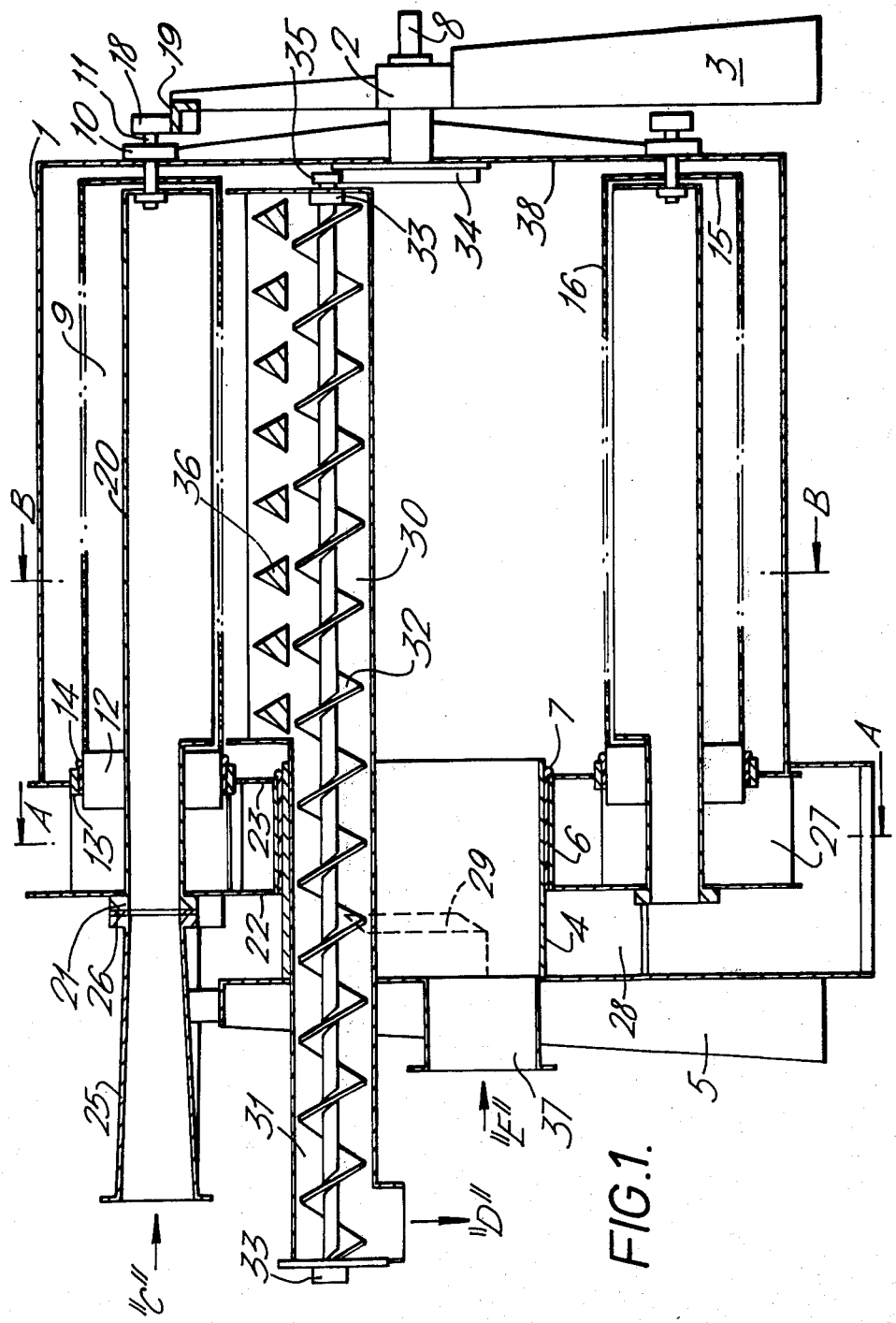
FIG. 1 is a longitudinal sectional view of the filter.

The filter consists of a closed drum 1 supported at one end in a bearing 2 which is mounted in a bearing block 3. The other end of the drum 1 is supported by a tube 4 secured to a bearing block 5. A drum bearing 6 can rotate on the tube 4. Between the tube 4 and the drum bearing 6 there is provided a water seal 7 to prevent liquid from being forced out of the drum 1.

The drum 1 can be driven by a motor through a transmission and a variator (not shown) acting on a drive journal 8. In the drum 1 there is provided a plurality of longitudinal, hollow, circular cylindrical filter elements 9 (in the drawing ten elements are indicated) one end of which is equipped with a shaft journal 11 mounted in a bearing 10. At the other end, the cylinders 9 have an open bearing portion 12 mounted in a bearing 13 in end wall 23 of the drum and provided with a water seal 14 to prevent liquid from being forced out of the drum 1 along the periphery of the cylinders 9.

Each cylinder 9 has a closed end wall 15, a rib structure, a perforated plate cylinder or a wire net cylinder covered by a screen 16 of suitable material, e.g. acid proof steel or plastic material, extends between said end wall 15 and the bearing portion 12. The circumference of the screen of filter cylinders 9 may be circular as shown in FIG. 2, or star-shaped or wave-shaped as shown at 17 in FIG. 4. Also other shapes giving the screen a large surface are conceivable. On the shaft journal 11, there is mounted a gear wheel or other wheel 18 which, during rotation of the drum 1, will engage a stationary track 19 formed as a circular arc, thereby making the filter elements 9 rotate.

The stationary track 19 is designed so as to rotate the cylinders 9 during a part only of their movement together with the drum 1. Inside each cylinder 9, there is arranged a blow tube 20 which, at the one end, is rotatably suspended on the shaft journal 11 and at the other end is rigidly secured to a sliding plate 21 rigidly connected to a cover plate 22. The cover plate 22 is rigidly connected to the drum bearing 6, which, in turn, is rigidly connected to the end wall 23. The blow tube 20 is provided with a longitudinal slot-shaped air nozzle 24. During rotation of the drum 1, the blow tubes 20 can be connected with a fan-shaped blow connection 25 mounted on the bearing block 5. A gasket 26 insures that the blow connection 25 sealingly engages the sliding plate 21. A fan (indicated at "C" in FIG. 1) provides air of sufficient quantity and pressure to the blow tubes 20. Guide plates 27 are inserted between the end walls 23 and the cover plate 22 for guiding liquid from the open end of the cylinders 9 to an outlet "F" (FIG. 3). The quantity of this liquid can be controlled by an adjustable plate 28. When the blow tube 20 is not connected with the blow connection 25, liquid may flow from the end of the tube to a channel 29 and out into the outlet F. The quantity of liquid from the blow tube 20 can be adjusted by raising and lowering the channel 29. Liquid which does not enter the outlet F, is discharged to an outlet "G."

Within the drum 1 there is mounted a trough 30 having a tube-shaped portion 31 extending through the tube 4 to an outlet "D." In the bottom of the trough 30 and in the tube-shaped portion 31 there is arranged a conveyor screw 32 which is mounted in bearings 33 and driven by a gear 34 attached to end wall 38 of the drum 1 at the drive end and a gear 35 on the conveyor screw 32, so that the rotation of the drum 1 drives the conveyor screw 32. A number of triangular pipes 36 inserted in the upper part of the trough 30 establish a communication between the liquid on either side of the trough 30. An inlet pipe 37 secured to the bearing block 5 serves to introduce liquid into the drum through the tube portion 4.

During normal operation the filter functions as follows:

Back water containing fibers enters through the inlet pipe 37, as indicated by "E", and fills the drum 1 to a water level "J." This level may be maintained by means of a level regulator within the drum 1 or by means of an adjustable overflow outside the filter and/or by means of a speed variator connected to the drive of the drum.

The drum rotates in the direction indicated by the arrow "H" and the cylinders 9 submerge sequentially into the back water. Water and some fibers will then flow through the screen 16 into the cylinders 9 and the blow tubes 20 and further out of the cylinders 9 and the blow tubes 20 through the open ends thereof and via the guide plates 27 and the channel 29, respectively, to the outlet F. After a certain time, a fiber coat will deposit on the screen 16, and this coat acts as a screening medium for the subsequent screening. Water and fibers from the outlet F are recirculated to the filter.

After the cylinders 9 with their guide plates 27 have passed the adjustable plate 28 and the blow tubes 20 have passed the adjustable channel 29, the purified water will flow through the outlet G. During the rotation of the drum, the cylinders 9 will gradually filter less and less back water, and when the cylinders 9 in turn emerge from the back water, the filter surfaces will become almost clogged by fibers. When cylinders 9 clear the back water on the emerging side, they are set in rotation by means of the wheel 18 which rolls on the stationary track 19. The speed of rotation of the cylinders 9 is such that they perform at least one full rotation while passing over the trough 30. When the cylinders 9 come over the trough 30, air from the fan "C" will be forced into the blow tubes 20 and via the air nozzle 24 or force fibers away from the outer surface of the cylinders 9 and into the trough 30. The fiber mass in then conveyed by the conveyor screw 32 to the outlet D.

By the further rotation of the cylinders 9, air from the fan C, with added water, if desired, will further clean the screen 16. Thereupon, the rotation of the cylinders 9 ceases and the cylinders are again ready for another filtering cycle.

The triangular pipes 36 ensure that the fiber-containing back water circulates and is not thickened at the point where the cylinders 9 emerge from the back water. The degree of purity of the purified water and the capacity of the filter depend upon the speed of rotation of the drum and the amount of recirculated water and fibers from the outlet F.

In particular cases, it may be necessary to add "foreign" coating mass to the back water thereby to create an improved screening medium on the cylinders 9. In other cases, it may be of interest to let some of the recovered fibers be blown off after the cylinders 9 have passed the trough 30. These fibers may then, by means of a mixing unit, be mixed with the back water at the point where the cylinders 9 submerge, an increased concentration is obtained in the zone of submersion, which will more rapidly produce a desired screening medium on the cylinders 9.

The filter of the invention is simple and reliable in operation. As the filter comprises several independent filter elements, it may easily be repaired if the screen of one of the elements should be damaged. Further, the filter may be operated without requiring all the filter elements to function at the same time. By covering one or more of the outlet openings of the filter elements, the capacity of the filter may be adjusted in a very simple way.

What I claim is:

1. In a filter apparatus for continuously separating solids from liquid, said filter apparatus comprising a closed, substantially cylindrically-shaped container including therein a plurality of axially-disposed, elongated filtering elements circumferentially spaced in substantially mutually parallel relation about the longitudinal axis of said container, said filtering elements comprising a medium for accumulating a deposit on the outer surface thereof when a liquid being filtered passes from the exterior to the interior thereof and being closed at one end and open at the other and having means for filtration of solids containing liquid entering the container through inlet means, means for filtering the liquid by maintaining a reduced pressure on the side of the filtering elements opposite that which the liquid is introduced compared with the static pressure of the liquid in the container, outlet means communicable with said filtering elements so that filtrate is discharged at atmospheric pressure, pneumatic-deposition-removal means for connection to a source of compressed air for periodically communicating interiorally with said filtering elements for dislodging a deposit off the outer surface of the filter elements while not immersed in the liquid being filtered, means operatively connecting said pneumatic-deposition-removal means and filtering elements to move relative to each other and for bringing said open ends of the filter elements sequentially into communication with the source of compressed air, and means for collecting and discharging the deposit from the filtering elements, the improvement comprising, in combination, in which said container is mounted for rotation about a horizontal axis coinciding with the longitudinal axis of the cylinder and having opposite end walls between which end walls said filtering elements extend, means supporting the filtering elements on the end walls of the cylinder for rotation about the horizontal axis together with said closed container and for successive dynamic submergence of the filtering elements into and out of solids containing liquid, means for maintaining a predetermined level of liquid in the container so that the filtering elements will thereby be subjected to hydraulic pressure varying between a minimum and a maximum, said open ends of the filtering elements extending through one extreme end wall of the container to permit unobstructed discharge of the filterate after the liquid to be filtered has passed from the container into the filtering elements from the outside to the interior thereof, said pneumatic-deposition-removal means comprising an elongated slot-shaped nozzle means extending axially within each filter element and being adapted to act on a limited portion of the interior of the respective filtering elements, said filtering elements being mounted for rotation about its respective longitudinal axis relative to the slot-shaped nozzle means, said means for collecting the deposit from the exterior of the filtering elements being mounted beneath the path of rotation of the filtering elements and said nozzle means being directed toward said means for collecting the deposit, and drive means for rotating each filtering element at least one full rotation when the filtering element is above the liquid level of the container, so that the pneumatic pressure from the nozzle means will act upon the total interior filtering surface of the filtering element at least once when above the liquid level and the means for collecting the deposit thereby detaching deposits from the outer surface of the filtering element and directing them into said means for collecting and discharging the deposit.

2. The filter apparatus as claimed in claim 1 in which said drive means comprise a drive wheel on the end of the filtering elements opposite said one open end, and a stationary track engagable with said drive wheel, said track extending along a portion of a circle about the horizontal axis of said container and said drive wheel having a circumference less than the length of said portion of a circle.

3. The filter apparatus as claimed in claim 2 in which said means for collecting and discharging the deposits detached from the filtering elements comprises a stationary trough having an upwardly-facing opening which lies above the liquid level and below the orbit of the filtering elements, and which extends through said one end wall of the container.

4. The filtering apparatus as claimed in claim 3, in which the trough is partly submerged in the liquid in the container and below the liquid level is provided with passages extending transversely from one side of the trough to the other, to allow flow of liquid therethrough for equalizing the difference in concentration of solids in the liquid on the two sides of the trough.

5. The filter apparatus as claimed in claim 3 in which a conveyor screw is provided in the bottom of the trough for conveying deposits from the container.

6. The filter apparatus as claimed in claim 5 in which the conveyor screw is provided with a drive wheel engaging a portion of the rotating container so that the rotation of the container drives the conveyor screw.

7. The filter apparatus as claimed in claim 1 in which the filtering elements are cylindrical.

8. The filter apparatus as claimed in claim 1 in which the circumference of the filtering elements is irregular in cross-section.

* * * * *